(12) United States Patent
Saha et al.

(10) Patent No.: US 9,594,565 B2
(45) Date of Patent: *Mar. 14, 2017

(54) HARDWARE ACCELERATION OF A WRITE-BUFFERING SOFTWARE TRANSACTIONAL MEMORY

(75) Inventors: Bratin Saha, San Jose, CA (US); Ali-Reza Adl-Tabatabai, Santa Clara, CA (US); Quinn Jacobson, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,841

(22) Filed: Aug. 1, 2012

(65) Prior Publication Data

US 2012/0297152 A1    Nov. 22, 2012

Related U.S. Application Data

(63) Continuation of application No. 13/094,370, filed on Apr. 26, 2011, now Pat. No. 8,200,909, which is a continuation of application No. 11/784,859, filed on Apr. 9, 2007, now Pat. No. 8,185,698.

(51) Int. Cl.
*G06F 12/08* (2016.01)
*G06F 9/38* (2006.01)
*G06F 9/46* (2006.01)

(52) U.S. Cl.
CPC .......... *G06F 9/3834* (2013.01); *G06F 9/3851* (2013.01); *G06F 9/3863* (2013.01); *G06F 9/467* (2013.01); *G06F 12/0842* (2013.01)

(58) Field of Classification Search
CPC .. G06F 12/0842; G06F 9/3834; G06F 9/3851; G06F 9/3863; G06F 9/467
See application file for complete search history.

(56) References Cited

U.S. PATENT DOCUMENTS

| 5,428,761 A * | 6/1995 | Herlihy et al. ............... 711/130 |
| 2003/0065887 A1 * | 4/2003 | Maiyuran et al. ............ 711/137 |

* cited by examiner

*Primary Examiner* — Aracelis Ruiz
(74) *Attorney, Agent, or Firm* — Blakely, Sokoloff, Taylor & Zafman LLP (57) ABSTRACT

A method and apparatus for accelerating a software transactional memory (STM) system is described herein. Annotation field are associated with lines of a transactional memory. An annotation field associated with a line of the transaction memory is initialized to a first value upon starting a transaction. In response to encountering a read operation in the transaction, then annotation field is checked. If the annotation field includes a first value, the read is serviced from the line of the transaction memory without having to search an additional write space. A second and third value in the annotation field potentially indicates whether a read operation missed the transactional memory or a tentative value is stored in a write space. Additionally, an additional bit in the annotation field, may be utilized to indicate whether previous read operations have been logged, allowing for subsequent redundant read logging to be reduced.

7 Claims, 6 Drawing Sheets

HARDWARE ACCELERATION OF A WRITE-BUFFERING SOFTWARE TRANSACTIONAL MEMORY

CROSS-REFERENCE TO RELATED APPLICATION

This application is a continuation of patent application Ser. No. 13/094,370, filed on Apr. 26, 2011, now U.S. Pat. No. 8,200,909; which is a continuation of patent application Ser. No. 11/784,859, filed on Apr. 9, 2007, now U.S. Pat. No. 8,185,698.

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict. One type of transactional execution includes a Software Transactional Memory (STM), where accesses are tracked, conflict resolution, abort tasks, and other transactional tasks are performed in software. As an example, determining if a current value associated with a current read is in a cache or in a write buffer. However, there is a potentially expensive overhead associated with performing all transactional tasks in software.

BRIEF DESCRIPTION OF THE DRAWINGS

The present invention is illustrated by way of example and not intended to be limited by the figures of the accompanying drawings.

FIG. 3b illustrates an embodiment of another portion of the flow diagram from FIG. 3a.

FIG. 3c illustrates an embodiment of another portion of the flow diagram from FIG. 3a.

DETAILED DESCRIPTION

In the following description, numerous specific details are set forth such as examples of specific hardware support for transactional execution, specific tracking/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific multi-core and multi-threaded processor architectures, interrupt generation/handling, cache organizations, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portions of the values.

The method and apparatus described herein are for accelerating a software transactional memory (STM) system. Specifically, accelerating a software transactional memory (STM) system is primarily discussed in reference to multi-core processor computer systems. However, the methods and apparatus for accelerating a software transactional memory (STM) system are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads, that utilize transactional memory.

Figure 1:
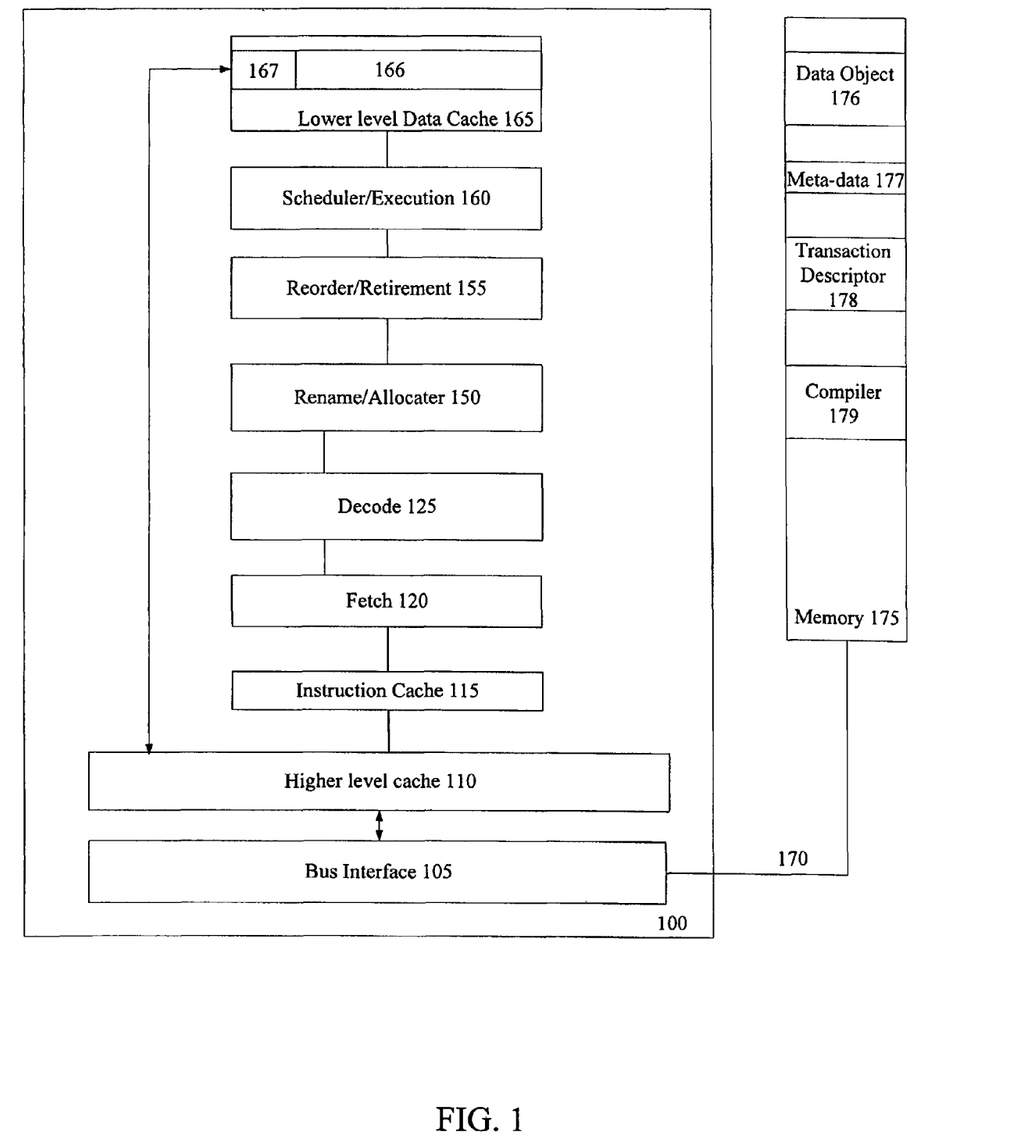
FIG. 1 illustrates an embodiment of a system capable of transactional execution.

Referring to FIG. 1, an embodiment of a processor capable of accelerating a software transactional memory (STM) system is illustrated. In one embodiment, processor 100 is a multi-core processor capable of executing multiple threads in parallel. However processor 100 may include any processing element, such as an embedded processor, cell-processor, microprocessor, or other known processor, which is capable of executing one thread or multiple threads. As an illustrative example, a simplified embodiment of an out-of-order architecture for a processor is illustrated in FIG. 1.

The modules shown in processor 100, which are discussed in more detail below, are potentially implemented in hardware, software, firmware, or a combination thereof. Note that the illustrated modules are logical blocks, which may physically overlap the boundaries of other modules, and may be configured or interconnected in any manner. In addition, the modules as shown in FIG. 1 are not required in processor 100. Furthermore, other modules, units, and known processor features may also be included in processor 100.

Bus interface module 105 is to communicate with a device, such as system memory 175, a chipset, a north bridge, or other integrated circuit. Typically bus interface module 105 includes input/output (I/O) buffers to transmit and receive bus signals on interconnect 170. Examples of interconnect 170 include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol.

Processor 100 is coupled to memory 175, which may be dedicated to processor 100 or shared with other devices in a system. Examples of memory 175 includes dynamic random access memory (DRAM), static RAM (SRAM), non-volatile memory (NV memory), and long-term storage. Bus interface unit 105 as shown is also to communicate with higher level cache 110.

Higher-level cache 110 is to cache recently fetched and/or operated on elements. In one embodiment, higher-level cache 110 is a second-level data cache. However, higher level cache 110 is not so limited, as it may be or include instruction cache 115 to store recently fetched/decoded instructions. Instruction cache 115, which may also be referred to as a trace cache, is illustrated before fetch logic 120 and decode logic 125. Here, instruction cache 115 stores recently fetched instructions that have not been decoded. Yet, instruction cache 115 is potentially placed after fetch logic 120 and/or after decode logic 125 to store decoded instructions.

Fetch logic 120 is to fetch data/instructions to be operated on/executed. Although not shown, in one embodiment, fetch logic includes or is associated with branch prediction logic, a branch target buffer, and/or a prefetcher to predict branches to be executed/taken and pre-fetch instructions along a predicted branch for execution. Here, a processor capable of speculative execution potentially prefetches and speculatively executes predicted branches. Decode logic 125 is coupled to fetch logic 120 to decode fetched elements.

Allocator and renamer module 150 includes an allocator to reserve resources, such as register files to store instruction processing results and a reorder buffer to track instructions. Unit 150 may also include a register renamer to rename program/instruction reference registers to other registers internal to processor 100. Reorder/retirement module 155 includes components, such as the reorder buffers mentioned above, to support out-of-order execution and later in-order retirement of instructions executed out-of-order. In one embodiment, where processor 100 is an in-order execution processor, re-order/retirement module 155 may not be included.

Scheduler and execution module 160, in one embodiment, includes a scheduler unit to schedule instructions/operations on execution units. Register files associated with execution units are also included to store information instruction processing results. Exemplary execution units include a floating point execution unit, an integer execution unit, a jump execution unit, a load execution unit, a store execution unit, and other known execution units.

Also shown in FIG. 1 is lower level data cache 165. Data cache 165 is to store recently used/operated on elements, such as data operands. In one embodiment, a data translation lookaside buffer (DTLB) is associated with lower level data cache 165. Often a processor logically views physical memory as a virtual memory space. As a specific example, a processor may include a page table structure to break physical memory into a plurality of virtual pages. Here, a DTLB supports translation of virtual to linear/physical addresses. Data cache 165 may be utilized as a transactional memory or other memory to track tentatively accessed data during execution of a transaction, as discussed in more detail below.

In one embodiment, processor 100 is a multi-core processor. A core often refers to any logic located on an integrated circuit capable of maintaining an independent architectural state, wherein each independently maintained architectural state is associated with at least some dedicated execution resources. In one embodiment, execution resources, such as execution module 160, include physically separate execution units dedicated to each core. However, execution module 160 may include execution units that are physically arranged as part of the same unit or in close proximity; yet, portions of execution module 160 are logically dedicated to each core. Furthermore, each core may share access to processor resources, such as higher level cache 110.

In another embodiment, processor 100 includes a plurality of hardware threads. A hardware thread typically refers to any logic located on an integrated circuit capable of maintaining an independent architectural state, wherein the independently maintained architectural states share access to some execution resources. For example, smaller resources, such as instruction pointers, renaming logic in rename allocater logic 150, an instruction translation buffer (ILTB) may be replicated for each hardware thread, while, resources, such as re-order buffers in reorder/retirement unit 155, load/store buffers, and queues may be shared by hardware threads through partitioning. Other resources, such as low-level data-cache and data-TLB 165, execution unit(s) 160, and parts of out-of-order unit 155 are potentially fully shared.

As can be seen, as certain processing resources are shared and others are dedicated to an architectural state, the line between the nomenclature of a hardware thread and core overlaps. Yet often, a core and a hardware thread are viewed by an operating system as individual logical processors, with each logical processor being capable of executing a thread. Logical processors may also be referred to herein as resources or processing resources. Therefore, a processor, such as processor 100, is capable of executing multiple threads on multiple logical processors/resources. Consequently, multiple transactions may be simultaneously and/or concurrently executed in processor 100.

A transaction includes a grouping of instructions, operations, or micro-operations, which may be grouped by hardware, software, firmware, or a combination thereof. For example, instructions may be used to demarcate a transaction. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible. However, if the transaction is invalidated during its pendency, the transaction is restarted without making the updates globally visible. As a result, pendancy of a transaction, as used herein, refers to a transaction that has begun execution and has not been committed or aborted, i.e. pending. Two example systems for transactional execution include a Hardware Transactional Memory (HTM) system and a Software Transactional Memory (STM) system.

A Hardware Transactional Memory (HTM) system often refers to tracking access during execution of a transaction with processor 100 in hardware of processor 100. For example, a cache line 166 is to cache data item/object 176 in system memory 175. During execution of a transaction, annotation/attribute field 167, which is associated with cache line 166 is utilized to track accesses to and from line 166. For example, attribute field 167 includes a transaction read bit to track if cache line 166 has been read during execution of a transaction and a transaction write bit to track if cache line 166 has been written to during execution of the transaction.

Attribute field 167 is potentially used to track accesses and detect conflicts during execution of a transaction, as well as upon attempting to commit the transaction. For example, if a transaction read bit in field 167 is set to indicate a read from line 166 occurred during execution of a transaction and a store associated with line 166 from another transaction occurs, a conflict is detected. Examples of utilizing an attribute field for transactional execution is included in co-pending application with U.S. Pat. No. 7,984,248 entitled, "Transaction based shared data operations in a Multiprocessor Environment."

A Software Transactional Memory (STM) system often refers to performing access tracking, conflict resolution, or other transactional memory tasks in software. As a general example, compiler 179 in system memory 175, when executed by processor 100, compiles program code to insert read and write barriers into load and store operations, accordingly, which are part of transactions within the program code. Compiler 179 may also insert other transaction related operations, such as commit or abort operations.

As shown, cache 165 is still to cache data object 176, as well as meta-data 177 and transaction descriptor 178. However, meta-data location 177 is associated with data item 176 to indicate if data item 176 is locked. A read log, which may be present in transaction descriptor 178, is used to log read operations, while a write buffer or other transactional memory, which may include lower-level data cache 165, is used to buffer or log write operations. Inserted calls for validation and commit utilize the logs to detect conflicts and validate transaction operations.

Figure 2:
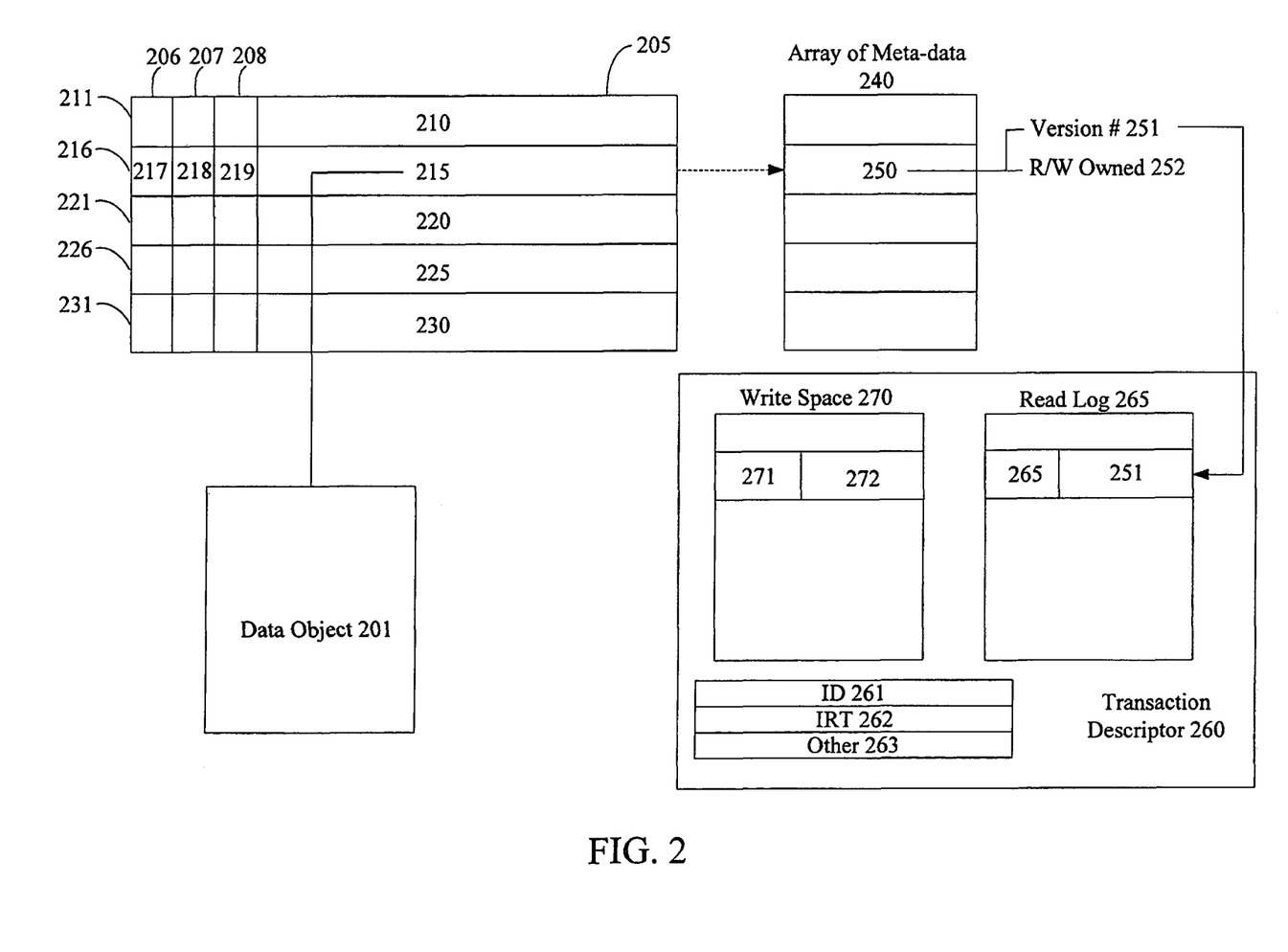
FIG. 2 illustrates an embodiment of a memory including annotation fields to accelerate a Software Transactional Memory (STM) system.

Referring to FIG. 2, an embodiment of a system including annotation fields to accelerate an STM is depicted. Data object 201 includes any granularity of data, such as a word, a line of memory, a cache line, a table, a hash table, or any other known data structure or object. For example, a programming language defined data object is data object 201. Transactional memory 205 includes any memory to store elements associated with transactions. Here, transactional memory 205 comprises plurality of lines 210, 215, 220, 225, and 230. In one embodiment, memory 205 is a cache memory. As an example, data object 201 is to be stored aligned in cache line 215. Alternatively, data object 201 is capable of being stored unaligned in memory 205.

In one example, each data object is associated with a meta-data location in array of meta-data 240. As an illustrative embodiment, an address associated with cache line 215 is hashed to index array 240, which associates meta-data location 250 with cache line 215 and data object 201. Note that data object 201 may be the same size of, smaller than (multiple elements per line of cache), or larger than (one element per multiple lines of cache) cache line 215. In addition, meta-data location 250 may be associated with data object 201 and/or cache line 215 in any manner.

Usually, meta-data location 250 represents whether data object 201 is locked or available. In one embodiment, when data object 201 is locked, meta data location 250 includes a first value to represent a locked state, such as read/write owned state 252. Yet, any lock or lock state may be utilized and represented in meta-data location 250. When unlocked, or available, meta-data location 250 includes a second value. In one embodiment, the second value is to represent version number 251. Here, version number 251 is updated, such as incremented, upon a write to data object 201, to track a current version of data object 201.

As an example to illustrate operation of the embodiment shown in FIG. 2, in response to a first read operation in a transaction referencing data object 201/cache line 215, the read is logged in read log 265. In one embodiment read log 265 is included in transaction descriptor 260. Transaction descriptor may also include write space 270, as well as other information associated with a transaction, such as transaction identifier (ID) 261, irrevocable transaction (IRT) indicator 262, and other transaction information. However, write space 270 and read log 265 are not required to be included in transaction descriptor 260. For example, write space 270 may be separately included in a different memory space from read log 265 and/or transaction descriptor 260.

In one embodiment, logging a read includes storing version number 251 and an address associated with data object 201 or cache 215 in read log 265. Here, assume version number 251 is one to simplify the example. Upon encountering a write referencing an address associated with data object 201, the write is potentially logged or tracked as a tentative update. In addition, the meta-data location is updated to a lock value, such as two, to represent data object 201 is locked by the transaction or resource executing the transaction. In one embodiment, the lock value is updated utilizing an atomic operation, such as a read, modify, and write (RMW) instruction. Examples of RMW instructions include Bit-test and Set, Compare and Swap, and Add.

In one embodiment, the write updates cache line 215 with a new value, and an old value 272 is stored in write space 270. Here, upon committing the transaction, the old values in the write space are discarded, and conversely, upon aborting the transaction, the old values are restored, i.e. the locations are "rolled-back" to their original values before the transaction. Examples of write space 270 include a write log, a group of check pointing registers, and a storage space to log/checkpoint values to be updated during a transaction.

In another embodiment, write space 270 is a buffer that buffers/stores the new value to be written to data object 201.

Here, in response to a commit, the new values are written to their corresponding locations, while in response to an abort the new values in write space 270 are discarded. More information on efficient checkpointing and roll-back for transactions is discussed in co-pending related application entitled, "Compiler Technique for Efficient Register Checkpointing to Support Transaction Roll-back".

Continuing the example from above, whether write space 270 is utilized as a write-buffer, a write-log, or not at all, the write, when committed, releases lock 250. In one embodiment, releasing lock 250 includes returning meta-data location 250 to a value of one to represent an unlocked state. Alternatively, the value is incremented to represent unlocked version value 251 of three. This versioning allows for other transactions that loaded data object 201 to validate their reads by comparing logged version values in their read logs to current version value 251.

The example above includes one embodiment of implementing an STM; however, any known implementation of an STM may be used. In fact, any known system for performing transactional memory may also be used, such as an HTM, an STM, an Unbounded Transactional Memory (UTM) system, a hybrid Transactional Memory system, such as a hardware accelerated STM (HASTM), or any other transactional memory system. Co-pending application entitled, "Overflow Method for Virtualized Transactional Memory," with Ser. No. 11/479,902 discusses extending/virtualizing an HTM.

In addition, FIG. 2 illustrates annotation fields 211, 216, 221, 226, and 231, which are associated with memory lines 210, 215, 220, 225, and 230, respectively. In one embodiment, annotation field 216 is included in cache line 215. In another embodiment, annotation field 216 is included in a separate array and is associated with line 215. Here, separate ports may be provided for access to annotation field 216, which potentially allows for concurrent access to cache lines and annotation fields.

In one embodiment, annotation field 216 is utilized as a filter to determine if line 215 has been accessed during execution of a transaction. In this case, when annotation field 216 includes a first value, the first value is to represent a most recent value associated with memory line 215 is currently present in write space 270. For example, in a write buffering STM (WBSTM) a new value to be written by the transaction to data object 201 through cache line 215 is buffered in write space 270. In response to the write in the transaction, the annotation field is set to the first value. As result, upon a subsequent read, the annotation field includes the first value to represent the most recent value associated with the data object 201 and line 215 is in write space 270. Therefore, the read may be directly serviced from the write space based on annotation field 216.

In addition, when annotation field 216 includes a second value, the second value is to represent the most recent value associated with data object 201 and line 215 is not in memory 205, i.e. a true miss to memory 205 has occurred. As an example, assume a second data object or element is cached in line 215. Upon a read operation referencing data object 201, when annotation field 216 includes a second value, the second value indicates a miss to cache 205. As a result, the miss to cache 205 may be directly serviced. In response to the miss, data object 201 is fetched and brought to line 215.

In one embodiment, write space 270 is searched in response to servicing a miss to see if an entry associated with data object 201 or an address referencing data object 201 exists. If an entry exists, it is determined a most recent value for the read is in write space 270. In contrast, if a write space entry does not exist, it is determined that the most recent value is the new value fetched and placed in line 215.

As an illustrative example, assume a write to data object 201 occurs during execution of a transaction and a write buffer entry in write space 270 is created with a write value to update data object 201. Now assume, that cache control logic based on a replacement algorithm, such as Last Recently Used (LRU), determines line 215 is to be evicted and replaced. Data object 201 is replaced causing annotation field 216 to lose the relevant annotation information associated with data object 201. Consequently, upon servicing a miss and bringing data object 201 back to memory 205, the newest value, i.e. the write value from above, associated with data object 201 resides in write space 270 from the earlier write in the transaction. Therefore, write space 270 is searched for a corresponding entry in response to servicing a true miss, to determine if the recently fetched item or a value in write space 270 is the most recent value.

Furthermore, when annotation field 216 includes a third value, the third value is to represent the most recent value associated with data object 201 is in the memory line. In one embodiment, the third value is the default or reset value for annotation field 216. Here, annotation field 216 is reset or initialized to the third value in response to starting a transaction. In response to a subsequent read during the transaction, if annotation field 216 includes the third value, then it is determined that no previous access to cache line 215 is present, i.e. the most recent value associated with data object 201 resides in memory line 215. Therefore, a read is potentially directly serviced from line 215 without having to search write space 270.

As an illustrative example, annotation field 216 includes three annotation bits 217, 218, and 219. Upon the start of a transaction, annotation field 216 is initialized, i.e. reset or set to default values. In an example below, all bits in columns 206 and 207 are reset to a first logical state, such as a logical zero, while column 208 including bit 219 is set to a second logical state, such as a logical one. Continuing the example from above, the third value, which is to indicate the most recent value is in memory line 215, includes bit 219 reset/initialized. Although reset and set are used to represent a logical zero and a logical one, respectively, reset and set may also refer to a logical one and zero, respectively, as well as resetting to a default state and setting to another state or value.

In response to encountering a first load operation during the transaction, annotation bit 219 is checked. If bit 219 is in its default state, then bit 219 represents that no update to line 215 has occurred during execution of the transaction. As a result, the first load is serviced from line 215 without checking write space 270. Upon encountering a store operation in the transaction, a write entry is created in write space 270 and the store value to be written to data object 201 is held/buffered in the write entry. In addition, bit 219 is reset and bit 218 is set, i.e. the first value from the example above, to indicate that line 215 has been modified and the most recent value associated with data object 201 resides in write space 270.

Additionally, in response to a second load operation referencing data object 201, annotation field 216 is checked. Here, bit 219 is reset and bit 218 is set to indicate the most recent value is in write space 270. Consequently, the second load operation may be serviced from write space 270. Alternatively, if data object 201 is evicted from line 215, upon a third load operation line 215 is missed. When data object 201 is fetched, write space 270 is searched. The entry including the write value from the previous write operation corresponds to data object 201. Therefore, the write value, i.e. the most recent value, is in write space 270.

Bit 217 is to indicate if previous reads have been logged in read log 265. From the example above, bit 217 is initially reset. When the first read of data object 201 is encountered during the transaction, bit 217 is still reset to indicate no previous reads to data object 201 during a pendancy of the transaction. Therefore, the first read is logged in read log 265. For example, an address associated with data object 201 and current version number 251 is stored in read log 265 to log the first read. Additionally, bit 217 is set to indicate a read of data object 201 has been previously logged. Therefore, when the second and third loads from the example above are encountered, bit 217 is checked and logging does not have to be performed, as bit 217 indicates logging for data object 201 has already occurred.

In one embodiment, operation or instructions to accelerate an STM are inserted in program code to utilize annotation bits. For example, when a start transaction instruction is detected, initialization operations/instructions are inserted to initialize annotation bits. Figure A below depicts an embodiment of pseudo code for start transaction operations to be inserted.

FIG. A: An embodiment of pseudo code for inserted start transaction operations

```
stmStart( ) {
    SetAllBits bit1;
    resetAllBits bit2;
    resetAllBits bit3;
}
```

A SetAllBits, a SetColumnBits, a ResetAllBits, and a ResetColumnBits may be inserted to set or reset all bits in a row, column, or all of the annotation bits. From the example above, all of bits in column 208, including bit 219, are initialized/set to a first logical level, such as a logical one, while columns 206 and 207 are reset to a second logical value, such as a logical zero. Note that other instructions may be inserted as well as a function call to the stmStart( ) function before or after a start transaction operation in program code. Figure B illustrates an embodiment of pseudo code for a read barrier and read barrier operations to be inserted in response to detecting a read/load operation in program code.

FIG. B: An embodiment of a pseudo code read barrier

```
stmRead( ) {
    check bit 1;
    if bit 1 set {
        check bit 3;
        if bit 3 not set {
            log into read set;
            set bit 3;
        }
        return value from memory
    } else {
        check bit 2;
        if bit 2 is set {
            mostRecentValue = Read value from write log;
        } else {
            Bring line into cache
            if address exists in write set {
                mostRecentValue = Read value from write log;
            }
```

FIG. B: An embodiment of a pseudo code read barrier

```
        else {
            mostRecentValue = value in memory;
            set bit 0;
        }
        Set bit 1;
    }
    If bit 3 is not set {
        Log address into read set;
        Set bit 3;
    }
    Return mostRecentValue;
    }
}
```

In this example, in response to detecting a load operation, a call to stmRead( ) is inserted. In addition, operations in stmRead are inserted. For example, a first read barrier operation is inserted to determine a state of a first annotation bit, i.e. the check bit 1 and/or the if bit 1 set operations in Figure B. Other operations include check bit operations to check states of other annotation bits, such as the second and third annotation bits, a read or store operation to read a most recent value from a write space/memory line or store a most recent value from a write space/memory line to a most recent value location or register, and a log operation to log a read operation/version value.

Furthermore, a plurality of miss operations may be inserted to be executed in response to bit 1 and bit 2 being reset. Here, bit 1 is checked, and if reset, bit 2 is checked. If bit 2 is reset, then operations to bring a data object/line to cache, a compare or search operation to determine if a corresponding address exists in a write log, and a read/store value to read/store the correct most recent value are inserted. Figure C below illustrates an embodiment of pseudo code for a write/store barrier to be inserted.

FIG. C: An embodiment of pseudo code for a write barrier to be inserted

```
stmWrite( ) {
    store the speculative write in the store buffers;
    reset bit 1;
    Set bit 2;
}
```

In one embodiment, new values to be written are tentatively stored in a cache memory, while the old updated values are logged in a write log in case of transaction roll-back. In an alternate embodiment, speculative/tentative updates are stored in the write space/buffer to update memory locations on commit, while the old values reside in their current memory locations. In the write buffer example shown in Figure C, operations to reset bit 1 and set bit 2 are inserted to indicate a most recent value is stored in the write buffer. Next, Figure D below illustrates an embodiment of commit transaction pseudo code to be inserted in program code by a compiler.

FIG. D: An embodiment of pseudo commit transaction code

```
stmCommit( ) {
    If validateReadSet is true {
        grab write locks for all the locations that will be updated;
        copy values from write buffer into memory locations;
        release all write locks;
```

-continued

FIG. D: An embodiment of pseudo commit transaction code

```
   } else { Abort transaction and restart; }
}
```

Here, the logged read set is validated. As an example, all logged versions are compared against current version numbers to ensure the reads are valid. Essentially, a logged version is compared to a current version, and if they do not match, the read is determined invalid because the difference of version indicates a remote resource has updated the read location invalidating the use of the element loaded in the transaction. If the reads are not valid, then the transaction is aborted. However, if the reads are valid, write locks are acquired, values are copied from the write buffer to the corresponding memory locations, and the write locks are released.

Above, reference to specific bits being reset or set are included. However, use of annotation bits is not so limited. In fact, any number of annotation bits may be used and may be set to any logical state to represent values that accelerate an STM, such as indicating where most recent values are currently stored or whether previous read/writes have been logged. For example, from above the first value is to indicate a most recent value is stored in a write space. An example of the first value included, a first bit location holding a logical zero and a second bit location holding a logical one. However, any states or values may be used in an annotation field to support acceleration of an STM, any instructions/operations to perform acceleration task may be inserted in program code accordingly.

Figure 3A:
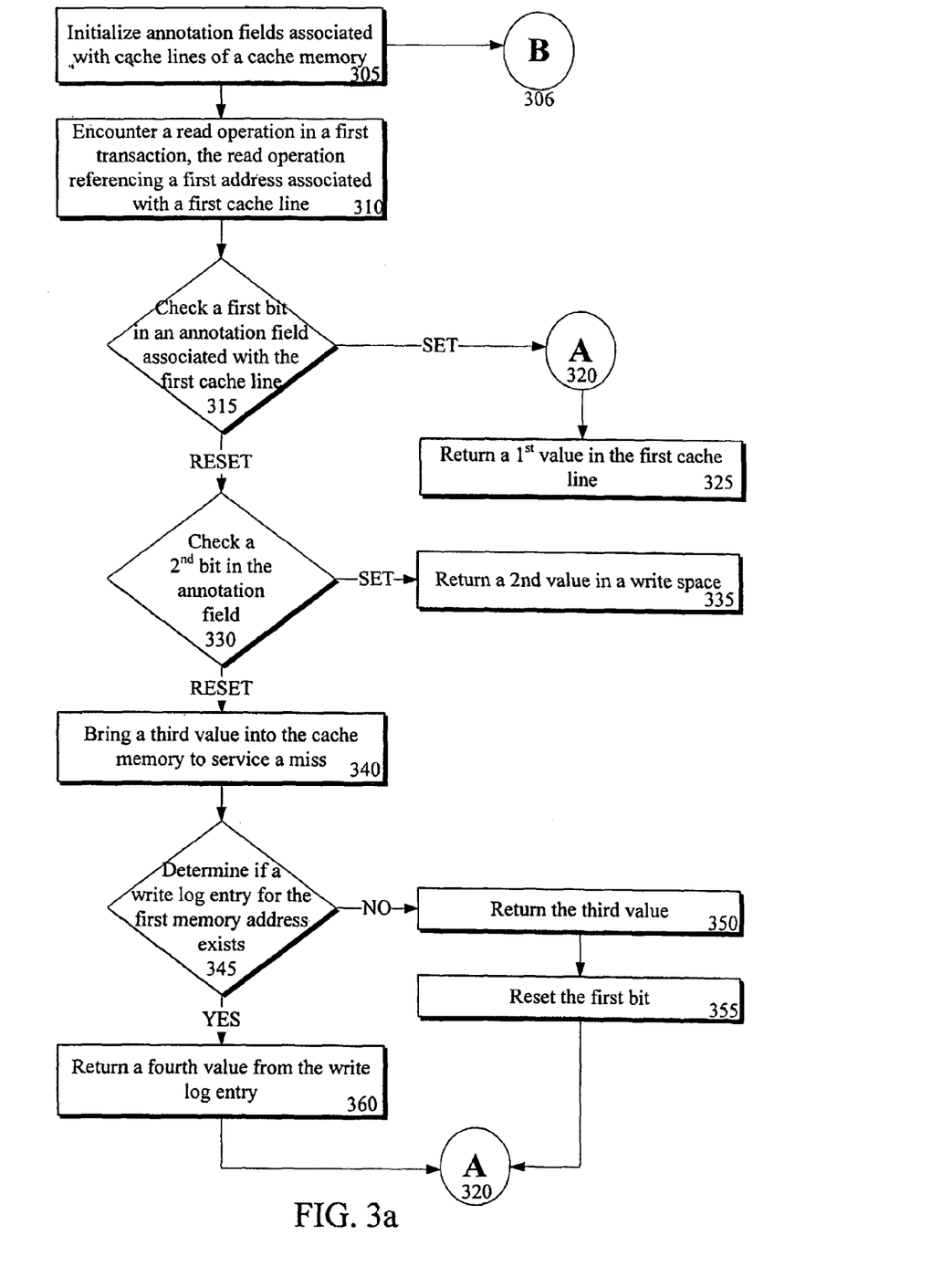
FIG. 3a illustrates an embodiment of a flow diagram for a method of accelerating a STM.
Figure 3B:
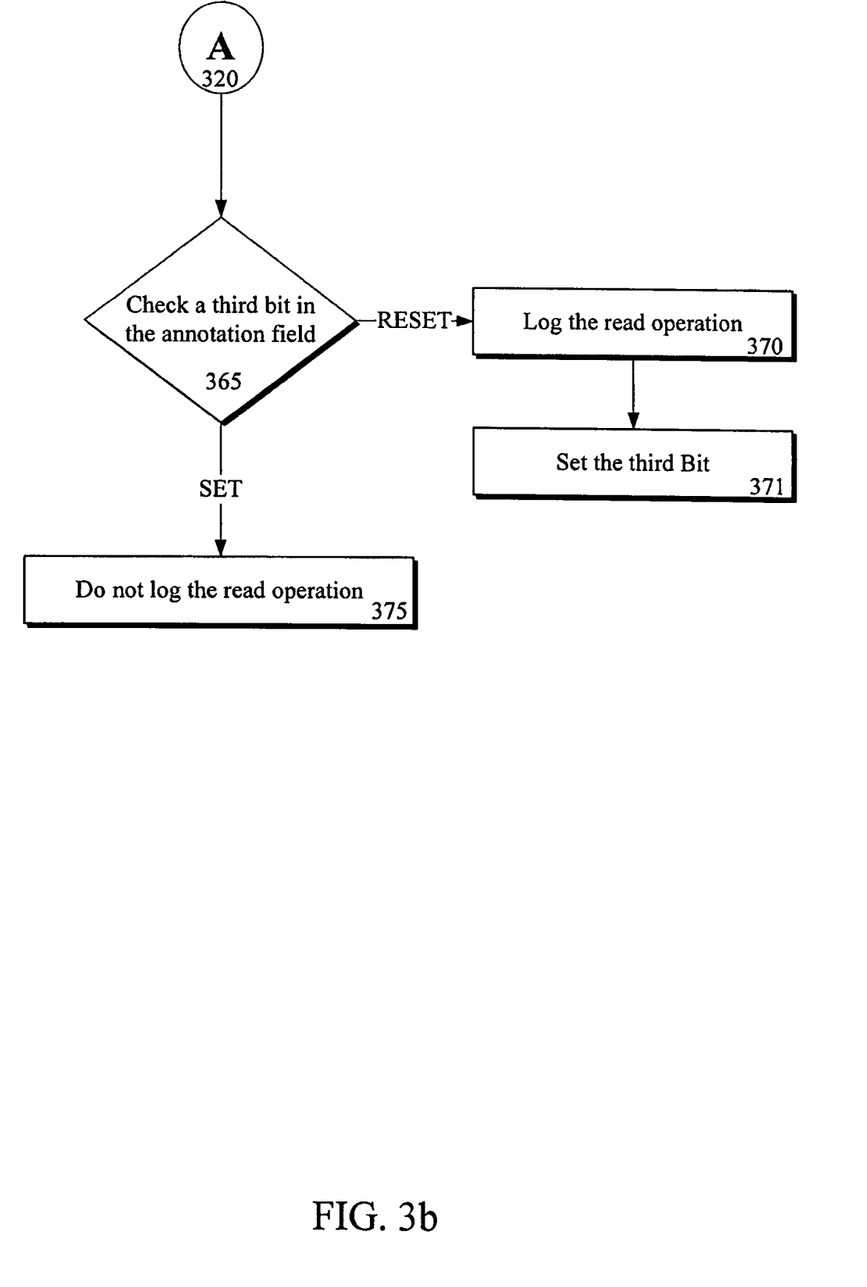
Figure 3C:
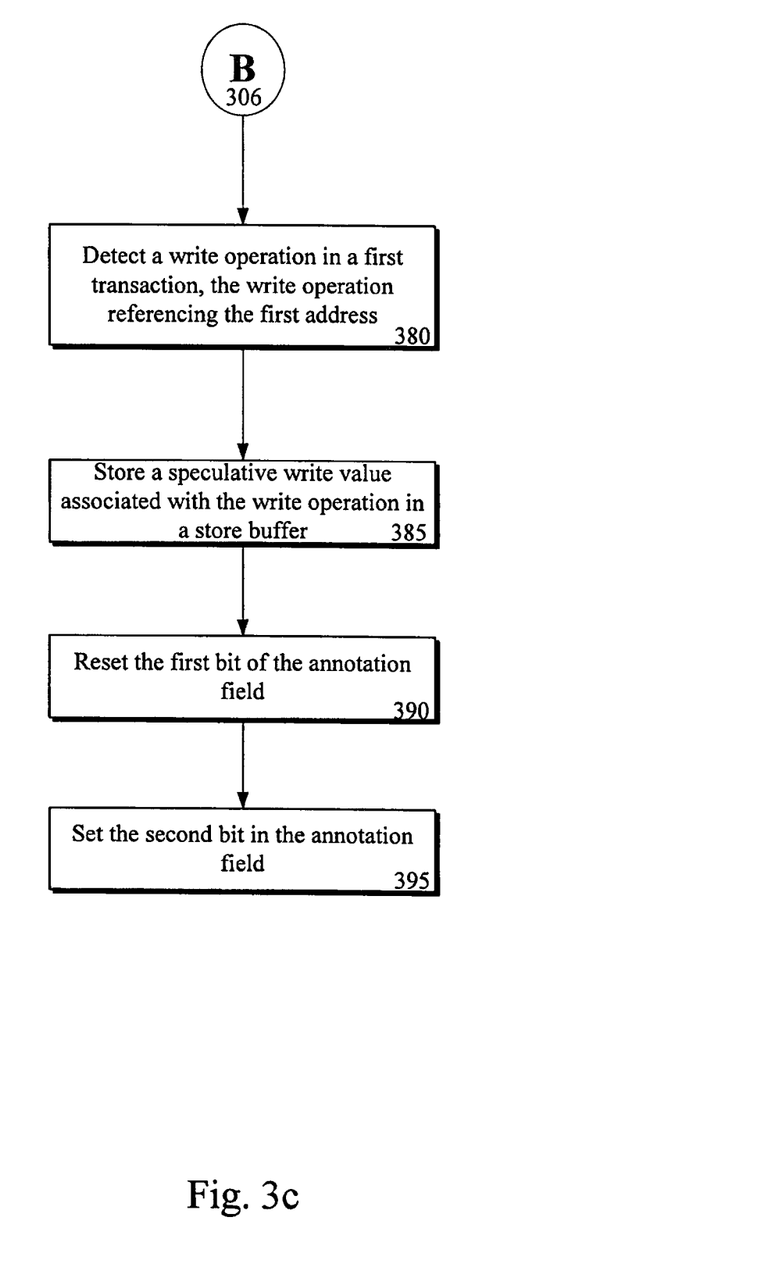

Referring next to FIGS. 3a, 3b, and 3c, an embodiment of a flow diagram for an execution flow in an accelerated STM system is illustrated. Note that an instruction or a plurality of instructions may be inserted by a compiler into code, such as program code, that when executed, results in the execution flow illustrated in FIGS. 3a, 3b, and 3c. In flow 305, annotation fields associated with cache lines of a cache memory are initialized. In one embodiment, all annotation bits are reset to a default value. In another embodiment, a first column of bits is set to a first logical value, such as a logical one, and another column of bits is set to a second logical state, such as a logical zero. Instructions, such as reset a column, set a column, reset all, set all, or set a bit, may be inserted to perform the initialization.

Next, in flow 310 a first read instruction referencing a first cache line is encountered. Here, a read barrier call or instruction referencing a read barrier is inserted. Inside the read barrier, in flow 315, a first bit in an annotation field associated with the first cache line is checked. A check bit instruction, a compare instruction, or other instruction may be inserted to check the state of the first annotation bit. If the bit is set, the flow moves to 320.

In reference to FIG. 3b, at flow 320, a third bit in the annotation field is checked in flow 365. Once again any instruction to check the state of the third annotation bit may be inserted. If the third bit is reset to the default value, i.e. the third bit represent no previous access, then the read operation is logged. For example, a version number associated with the read is logged. In addition, in flow 320, the third bit is set to indicate a read to the cache line has occurred. However, if the bit is set after checking the third bit in flow 365, indicating a previous access, the read is not logged. Consequently, potentially redundant logging may be reduced by eliding subsequent read logging of reads to the same location within a transaction. Any logging operation, such as a store operation to store the version number, may be inserted to perform the requisite read logging.

Moving back to FIG. 3a, in flow 325, a first value held in the first cache line is returned, if the first bit was set. However, if the first bit is reset, i.e. a previous update has occurred, a second bit in the annotation field is checked in flow 330. If the second bit is set, which indicates the most recent value is in the write log, a second value held in the write log is returned in flow 335. Yet, if the second bit is reset, the combination of the first bit being reset and the second bit being reset indicates a true miss has occurred. As a result, a third value is fetched/brought to the cache to service the miss in flow 340.

In flow 345, it is determined if a write log entry for the first memory address exists in a write log. In one embodiment, the write space is searched to find a matching address. As an example of this condition, a previously tentatively updated address may be evicted while the transaction is still pending. When the new line is brought back to the cache to service the miss, the newest value, i.e. a fourth value, is the tentative value buffered before the line was evicted. Therefore, the fourth tentative value buffered in the write space is to be returned for local reads in flow 360, since it is the most current value associated with the address.

However, if no entry exists in the write space, then the fetched line, i.e. the third value, is the most recent value. Consequently, the third value is returned in flow 350 and the first bit is reset in flow 355 to indicate no previous update to the cache line, i.e. the most recent value resides in the cache line. Returning up to flow 305, if instead of encountering/detecting a read/load operation in flow 310, a write/store operation is detected/encountered in flow 380 of FIG. 3c, then the flow moves to 306. In this example, the detected write operation references the first memory address associated with the first cache line, as shown in flow 380.

In flow 385, a speculative write value is stored in a store buffer/write space. Next, in flow 390, the first bit of the annotation field is reset and, in flow 395, the second bit is set to indicate a location of the most recent value. In this example, the location of the most recent value is the write buffer, as the write buffer is to buffer new tentative values to be written to associated memory location upon committing the transaction.

Figure 4:
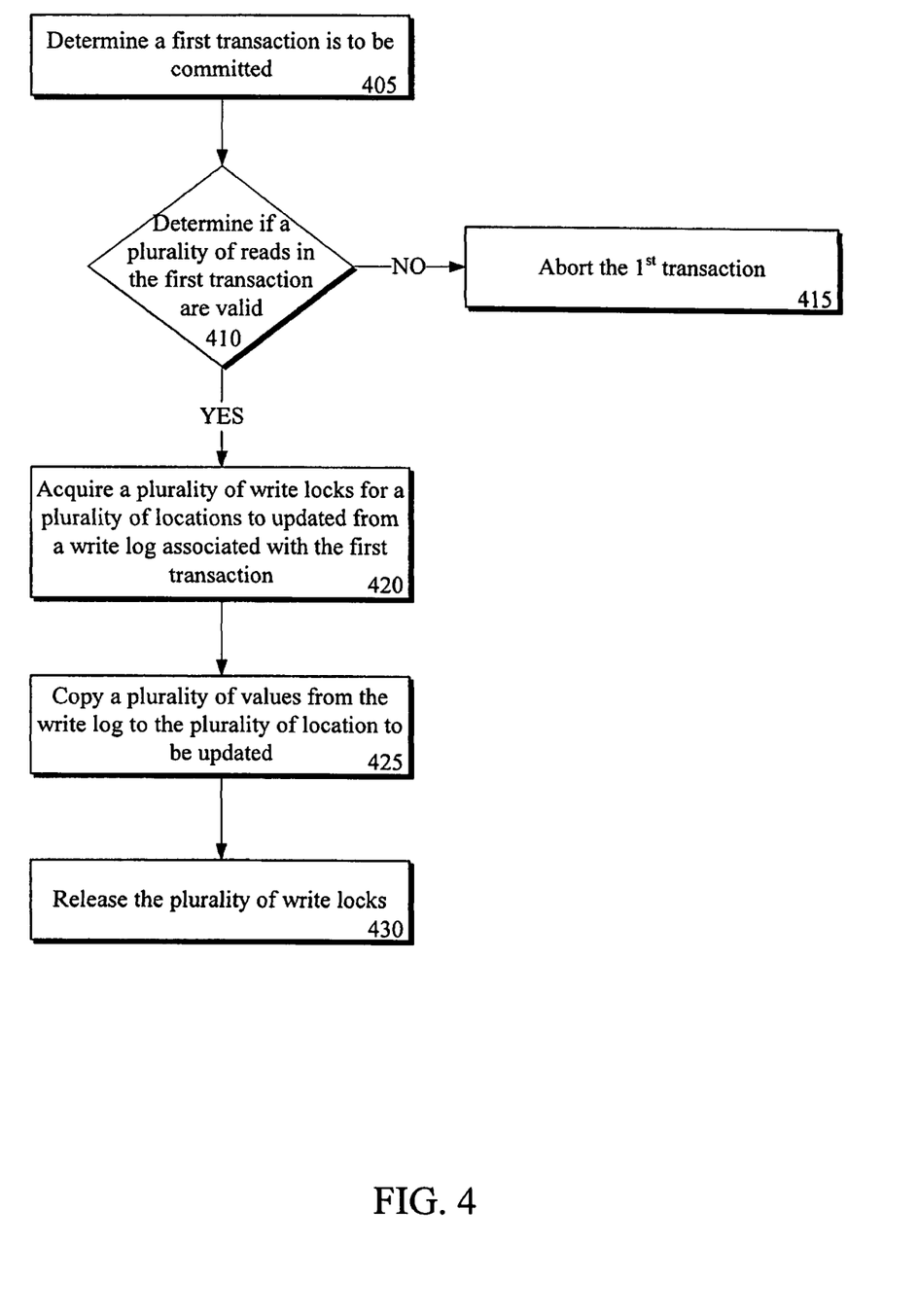
FIG. 4 illustrates an embodiment of a flow diagram for a method of committing a transaction in an accelerated STM system.

Referring next to FIG. 4, an embodiment of a flow diagram for committing a transaction is illustrated. In flow 405, it is determined a first transaction is to be committed. In one embodiment, a commit transaction instruction is detected. In flow 410, it is determined if previous reads in the transaction are valid. Here, read and compare instructions may be inserted to determine if logged version values are the same as current version values. If the read set is not valid, then the first transaction is aborted in flow 415. In a speculative write buffer implementation, new speculative values in the write buffer are discarded.

Alternatively, in flow 420, a plurality of write locks for a plurality of locations to be updated are acquired in flow 425, in response to determining the reads are valid. Furthermore, in flows 425 and 430 a plurality of values from the write log are copied to the plurality of locations to be updated and the plurality of locks are released.

In the above discussion, acceleration of an STM through utilization of annotation bits is illustrated. During read operations, an annotation field may indicate if a previous read associated with the same memory location has already been logged. As a result, the read may be performed without subsequent logging during a transaction, potentially reducing redundant read logging. Furthermore, the annotation field may provide hints for locality of most recent elements during execution of a transaction. As a result, reads may be conducted from the cache or the write buffer directly without extraneous searching to determine where the most recent value is stored.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
    encountering a first read instruction in a first transaction, the first read instruction referencing a first address; and
    in response to encountering the first read instruction:
        checking an attribute field associated with a first memory line in a memory, wherein the first address is associated with the first memory line;
        determining if the first address has been modified during execution of the first transaction based on the attribute field; and
        reading a first value from the first memory line without searching a write space associated with the first transaction, in response to determining the first address has not been modified during execution of the first transaction; and
        reading a write value from the software maintained write space associated with the first transaction, in response to determining the first address has been modified during execution of the first transaction.

2. The method of claim 1, wherein the attribute field comprises a first and a second bit, and wherein determining if the first address location has been modified during execution of the first transaction based on the attribute field comprises:
    checking the first bit;
    determining the first address location has not been modified during execution of the first transaction, in response to the first bit being in a first logical state;
    checking the second bit, in response to the first bit being in a second logical state;
    determining the first address location has been modified during execution of the first transaction, in response to the second bit being in the second logical state.

3. The method of claim 2, further comprising:
    determining a miss to the memory line has occurred after checking the second bit, in response to the second bit being in the first logical state.

4. The method of claim 3, further comprising, in response to the second bit being in the first logical state,
    bringing a new value to the memory line of memory to service the miss;
    determining if a write log entry associated with the first address exists, the write log to include a write value;
    returning the write value in response to determining the write log entry exists; and
    returning the new value in response to determining the write log entry does not exist.

5. The method of claim 2, further comprising: reading a write log value from the write log associated with the first transaction, in response to determining the first address has been modified during execution of the first transaction.

6. The method of claim 2, further comprising:
    detecting a first write instruction in the first transaction; in response to detecting the first write instruction:
        storing a write log value in the write log associated with the first transaction;
        updating the first bit to the first logical state;
        updating the second bit to the second logical state.

7. The method of claim 6, further comprising:
    committing the first transaction, wherein committing the first transaction comprises:
        determining if a plurality of read instructions in the first transaction, including the read instruction, are valid;
        acquiring a plurality of write locks for a plurality of addresses to be modified including the first address;
        copying a plurality of write values from the write log to a plurality of memory lines in the memory, including the write log value from the write log to the memory line, in response to determining the plurality of read instructions are valid; and
        releasing the plurality of write locks.

* * * * *